United States Patent

Yagame et al.

(10) Patent No.: US 9,494,234 B2
(45) Date of Patent: Nov. 15, 2016

(54) HOLE PLUG (71) Applicants: NIFCO, INC., Yokosuka-shi, Kanagawa (JP); TOYOTA JIDOSHA KABUSHIKI KAISHA, Toyota-shi, Aichi (JP)

(72) Inventors: Naofumi Yagame, Yokosuka (JP); Hiroaki Haijima, Toyota (JP)

(73) Assignees: NIFCO, INC., Yokosuka-shi (JP); Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 14/759,443

(22) PCT Filed: Jan. 9, 2014

(86) PCT No.: PCT/JP2014/050234
§ 371 (c)(1),
(2) Date: Jul. 7, 2015

(87) PCT Pub. No.: WO2014/109361
PCT Pub. Date: Jul. 17, 2014

(65) Prior Publication Data
US 2015/0362073 A1 Dec. 17, 2015

(30) Foreign Application Priority Data

Jan. 9, 2013 (JP) .................................. 2013-001844

(51) Int. Cl.
*F16K 17/04* (2006.01)
*F16J 13/14* (2006.01)
(Continued)

(52) U.S. Cl.
CPC ................ *F16J 13/14* (2013.01); *B62D 25/24* (2013.01); *F16K 17/30* (2013.01); *F16K 27/00* (2013.01); *Y10T 137/9247* (2015.04)

(58) Field of Classification Search
CPC ......... F16K 27/00; F16K 17/30; F16J 13/14; B62D 25/24; Y10T 137/9247
USPC .............. 137/527, 527.2, 527.8, 329.1, 403, 137/454.2, 469; 251/247, 298, 303, 305, 251/338
See application file for complete search history.

(56) References Cited

U.S. PATENT DOCUMENTS 137,447 A * 4/1873 Hitchcock ............... F16K 15/03
137/527
274,222 A * 3/1883 Pfau ....................... F16K 15/03
137/527.2

(Continued)

FOREIGN PATENT DOCUMENTS

CN    101943281 A    1/2011
EP    1595771 A2    11/2005

(Continued)

OTHER PUBLICATIONS

Jan. 15, 2016 Office Action issued in Chinese Patent Application No. 201480004167.3.

(Continued)

*Primary Examiner* — Kevin Murphy
*Assistant Examiner* — Minh Le
(74) *Attorney, Agent, or Firm* — Oliff PLC (57) ABSTRACT In a hole plug, shaft bearing portions that axially support a shaft section of a flap valve are formed to an upper portion of an upright wall portion of a panel configuring a housing. The shaft bearing portions are positioned above a groove portion of an engagement section that acts as a contact portion with an opening hole of a floor panel, and are positioned above a lower end edge of a resilient engagement portion.

6 Claims, 9 Drawing Sheets

(51) Int. Cl.
*B62D 25/24* (2006.01)
*F16K 17/30* (2006.01)
*F16K 27/00* (2006.01)

(56) References Cited

U.S. PATENT DOCUMENTS

| | | | | |
|---|---|---|---|---|
| 814,788 | A * | 3/1906 | Lenhart | F16K 15/03 137/247.19 |
| 1,629,457 | A * | 5/1927 | Bulman | E03F 5/042 137/247.19 |
| 1,761,217 | A * | 6/1930 | Lukomski | E03F 5/042 137/247.19 |
| 1,772,086 | A * | 8/1930 | Porter | F16K 15/03 137/454.2 |
| 1,811,611 | A * | 6/1931 | Carlson | E03F 5/042 137/527 |
| 2,578,076 | A * | 12/1951 | Kirby | F16K 15/03 137/454.2 |
| 2,578,590 | A * | 12/1951 | Perrault | F16K 15/03 137/493.5 |
| 2,770,315 | A * | 11/1956 | Powell | E03F 5/042 137/247.19 |
| 3,700,135 | A * | 10/1972 | Collier | B65D 51/00 220/200 |
| 5,323,804 | A * | 6/1994 | Lin | E03F 5/0407 137/362 |
| 6,050,294 | A * | 4/2000 | Makowan | E03B 7/077 137/527 |
| 6,679,290 | B2 * | 1/2004 | Matthews | F16K 15/031 137/527 |
| 7,137,405 | B2 * | 11/2006 | Barrows | F16K 15/03 118/715 |
| 7,828,011 | B2 * | 11/2010 | Huet | F16K 15/033 137/521 |
| 8,485,593 | B2 * | 7/2013 | Ogawa | B62D 25/24 296/154 |
| 8,672,178 | B2 * | 3/2014 | Siragusa | B62D 25/24 220/789 |
| 8,967,183 | B2 * | 3/2015 | Oakner | F24F 13/222 134/102.2 |
| 9,309,972 | B2 * | 4/2016 | Sato | B62D 25/24 |
| 2006/0081292 | A1 * | 4/2006 | Sarno | F16K 15/033 137/527 |
| 2007/0062962 | A1 * | 3/2007 | Iwahara | B60R 13/06 220/796 |
| 2008/0083464 | A1 * | 4/2008 | Shimizu | E03F 1/006 137/527 |
| 2011/0061751 | A1 * | 3/2011 | Jumpol | F16K 15/03 137/527 |
| 2011/0233950 | A1 * | 9/2011 | Takita | B60R 16/0222 296/1.06 |
| 2013/0000745 | A1 * | 1/2013 | Witkowski | F16K 15/03 137/15.18 |
| 2014/0020770 | A1 * | 1/2014 | Son | B62D 25/24 137/354 |
| 2016/0010756 | A1 * | 1/2016 | Fallon | F16K 27/0227 137/12 |

FOREIGN PATENT DOCUMENTS

| | | | | |
|---|---|---|---|---|
| JP | S63-101180 | A | 5/1988 | |
| JP | S63-112947 | U | 7/1988 | |
| JP | H04-17656 | Y2 | 4/1992 | |
| JP | 4409548 | B2 | 2/2010 | |
| JP | WO 2013151168 | A1 * | 10/2013 | B62D 25/24 |
| JP | WO 2014088100 | A1 * | 6/2014 | F16J 13/14 |

OTHER PUBLICATIONS

Jun. 2, 2015 Office Action issued in Japanese Application No. 2013-001844.

* cited by examiner

HOLE PLUG

TECHNICAL FIELD

The present invention relates to a hole plug for attaching to a water drainage opening hole pierced through an attached-to member.

BACKGROUND ART

The disclosures of Japanese Utility Model Application Laid-Open (JP-U) No. S63-112947 and Japanese Patent Application Laid-Open (JP-A) No, S63-101180 are, for example, already known in this technical field. In JP-U No. S63-112947, the opening face of a water discharge port formed at the bottom end of a drain pipe is sloped, and a valve that opens and closes such a water discharge port is configured to swing about a fixed upper portion. In JP-A No. S63-101180, a water absorbing rubber swells due to the process of water that has accumulated at the inside of a floor panel flowing downward from a plate into a chamber section. A valve body provided at the lower end of the chamber section is thereby press downward, so as to open a water discharge hole. An example of a hole plug not provided with a valve or valve body to open and close an opening hole is given in Japanese Patent No. 4409548.

LIST OF RELATED PATENT DOCUMENTS

Patent Document 1: Japanese Utility Model Application Laid-Open (JP-U) No. S63-112947
Patent Document 2: Japanese Patent Application Laid-Open (JP-A) No. S63-101180
Patent Document 3: Japanese Patent No. 4409548

SUMMARY OF INVENTION

Technical Subject

The present invention provides a hole plug capable of opening and closing a water drainage opening hole, and also capable of shortening the overall length along the up-down direction.

Solution to Subject

A first aspect of the present invention provides a hole plug including: a housing capable of internally accumulating water that has entered through a water entry port; an engagement section that is provided at the housing, that is configured to be inserted through an opening hole in an attached-to member, and that engages with a peripheral edge portion of the opening hole; a water discharge port that is formed in the housing to discharge water that has accumulated inside the housing; a shaft bearing portion formed at a location on the housing positioned above a contact portion of the engagement section with the opening hole; a valve body that includes a shaft portion axially supported by the shaft bearing portion so as to be capable of rotating, and that is capable of swinging between an open position opening the water discharge port and a closed position closing off the water discharge port; and a biasing member that is provided at the shaft portion in order to swing the valve body in the closed position direction using biasing force, and to swing the valve body in the open position direction when water pressure inside the housing is greater than the biasing force.

In the above aspect, the engagement section provided at the housing engages with the peripheral edge portion of the opening hole in the attached-to member. The water discharge port is formed in the housing to discharge water that has entered through water entry port and accumulated inside the housing, and the shaft portion of the valve body is axially supported by the shaft bearing portion of the housing, such that the valve body swings between an open position opening the water discharge port and a closed position closing off the water discharge port. Furthermore, the biasing member is provided at the shaft portion of the valve body, and when the water pressure inside the housing is less than biasing force of the biasing member, the biasing member swings the valve body under biasing force in the closed position direction and closes the water discharge port. However, when the amount of water inside the housing increases, and the water pressure becomes greater than the biasing force of the biasing member, the valve body is swung in the open position direction against the biasing force of the biasing member, opens the water discharge port, and discharges water. The shaft bearing portion is formed at a location on the housing positioned above a contact portion of the engagement section with the opening hole. This thereby enables the overall length of the hole plug along the up-down direction to be made shorter than configurations in which the center of rotation of the valve body is positioned below the opening hole of the attached-to member.

A second aspect of the present invention is the first aspect of the present invention, which may be configured such that the engagement section includes a resilient engagement portion that makes contact with one end of the peripheral edge portion of the opening hole and that is capable of elastic deformation toward an inner peripheral direction of the opening hole, and a groove portion that engages with another end of the peripheral edge portion of the opening hole.

In the above aspect, when attaching the hole plug to the opening hole, the resilient engagement portion is pressed against one end of the peripheral edge portion of the opening hole and is elastic deformed toward the inner peripheral direction of the opening hole, and the groove portion is engaged with the other peripheral edge portion of the opening hole. However, when separating the hole plug from the opening hole, the resilient engagement portion is pressed against one end of the peripheral edge portion of the opening hole, is elastically deformed toward the inner peripheral direction of the opening hole, and the groove portion is separated from the other end of the peripheral edge portion of the opening hole. This thereby enables easy attachment of the hole plug to the opening hole, and detachment of the hole plug from the opening hole.

A third aspect of the present invention is the first or second aspect of the present invention, which may be configured to further include a lattice shaped section formed at a lower portion of the housing so as to cover a lower side of the valve body.

In the above aspect, the lattice shaped section formed at a lower portion of the housing covers the lower side of the valve body. This thereby enables water to be discharged through the lattice shaped section. Moreover, flying stones and the like can be prevented from striking the valve body by the lattice shaped section.

A fourth aspect of the present invention is any one of the first to third aspects of the present invention, which may be configured such that a thickness of a peripheral edge portion of the valve body, that makes contact with an opening edge portion of the water discharge port, is thinner than a thickness of a central portion that is formed at inner side of the peripheral edge portion.

In the above aspect, the thickness of the peripheral edge portion of the valve body, that makes contact with the opening edge portion of the water discharge port, is thinner than a thickness of a central portion that is formed at inner side of the peripheral edge portion. This thereby enables the rigidity of the valve to be secured, and at the same time the peripheral edge portion of the valve body flexes, so as to make close contact with the opening edge portion of the water discharge port. As a result, the sealing property of the valve body is raised.

A fifth aspect of the present invention is any one of the first to the fourth aspects, which may be configured such that the water discharge port is formed in an upright wall portion of the housing, and an upper portion of the water discharge port is positioned above the opening hole.

In the above aspect, the water discharge port is formed in the upright wall portion of the housing. A configuration is thereby achieved in which, in an attached state of the hole plug to the opening hole of the attachment member, the valve body closes off the water discharge port form a direction intersecting with the vertical direction in which water accumulates. As a result, weight of the valve body is added to the biasing force of the biasing member, enabling the load of the biasing member to be reduced. Moreover, even if, by chance, the biasing force due to the biasing member ceases to act on the valve body due to the biasing member breaking or the like, the water discharge port can still be closed off by the weight of the valve body itself.

A sixth aspect of the present invention is any one of the first to the fifth aspects, which may be configured such that an opening face of the water discharge port faces upward at an angle in an attached state of the hole plug, and supports the valve body at an angle from the lower side.

In the above aspect, the opening face of the water discharge port faces upward at an angle in an attached state of the hole plug to the opening hole of the attached-to member, and supports the valve body at an angle from the lower side. A configuration is accordingly achieved in which, in an attached state of the hole plug to the opening hole of the attached-to member, the valve body closes off the opening hole from above at an angle with respect to the vertical direction in which water accumulates in the housing. As a result, weight of the valve body is added to the biasing force of the biasing member, enabling the sealing property between the water discharge port and the valve body to be raised.

Advantageous Effects of the Invention

In the first aspect of the present invention, the configuration described above enables the water drainage opening hole to be opened and closed, and also enables the overall length along the up-down direction to be made shorter.

In the second aspect of the present invention, the configuration described above enables easy attachment to the opening hole, and detachment from the opening hole.

In the third aspect of the present invention, the configuration described above enables water to be discharged, and enables damage to the valve body to be prevented.

In the fourth aspect of the present invention, the configuration described above enables the sealing property of the valve body to be raised.

In the fifth aspect of the present invention, the configuration described above enables the load of the biasing member to be reduced.

In the sixth aspect of the present invention, the configuration described above enables the sealing property between the water drainage hole and the valve body to be raised.

DESCRIPTION OF EMBODIMENTS

Explanation follows regarding a hole plug according to a first exemplary embodiment of the present invention, with reference to FIG. 1 to FIG. 8. The arrow UP in the drawings indicates the up-down direction of the hole plug and the vehicle body up-down direction.

Hole Plug Configuration

Figure 1:
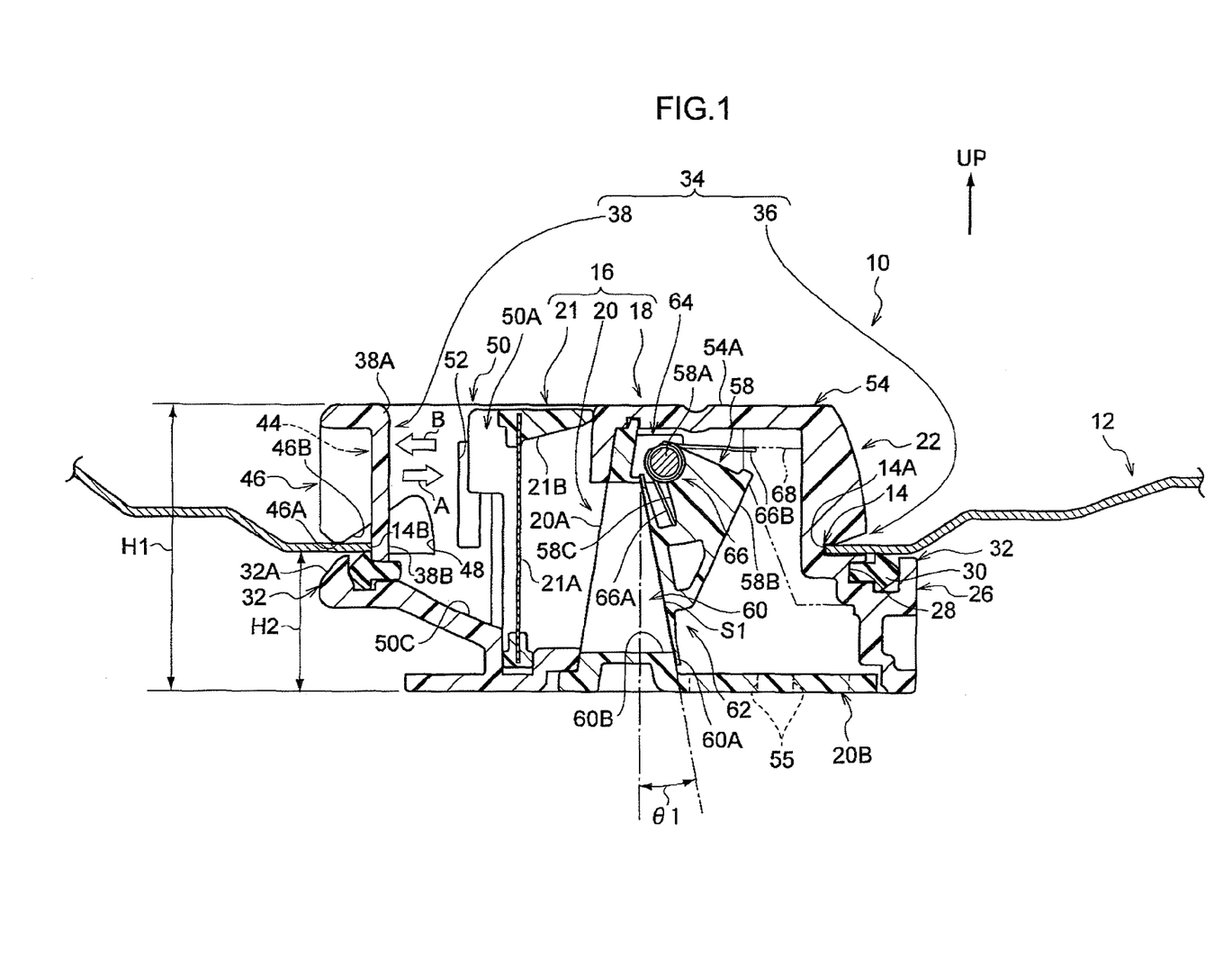
FIG. 1 is a side cross-section illustrating a closed valve state of a hole plug according to a first exemplary embodiment of the present invention.

As illustrated in FIG. 1, a hole plug 10 according to the present exemplary embodiment is attachable to an opening hole 14, formed at a floor panel 12 as an attached-to member configuring a floor of a vehicle, in order to drain water.

Figure 3:
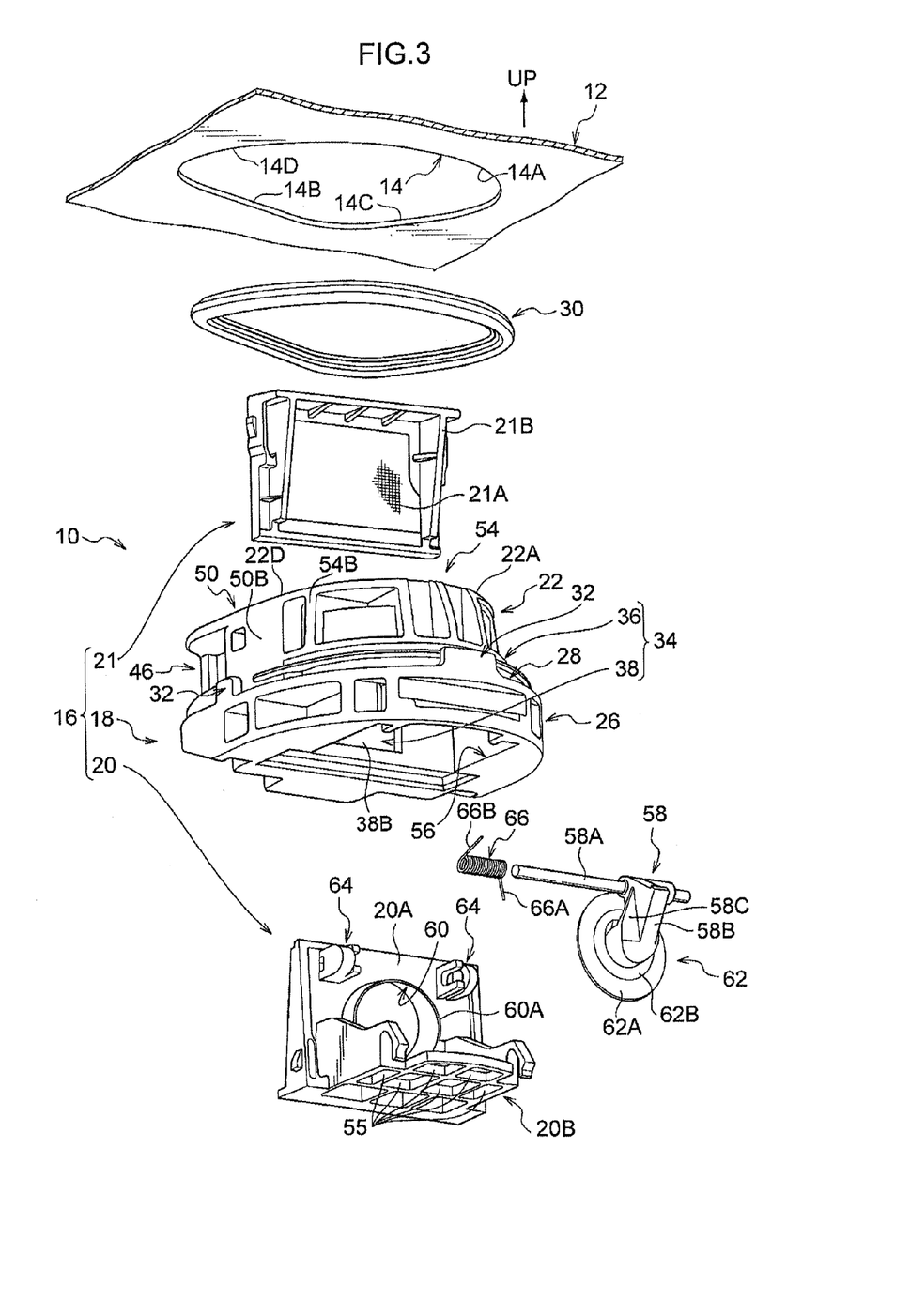
FIG. 3 is an exploded perspective view illustrating a hole plug according to the first exemplary embodiment of the present invention, as viewed from below at an angle of a groove portion side.

As illustrated in FIG. 3, the opening hole 14 has one side 14A that is circular arc shaped, and another three sides 14B, 14C, 14D that configure a straight line. The side 14A and the side 14B face each other, with the side 14B at one end of the peripheral edge portion of the opening hole 14, and the side 14A at the other end. A housing 16 of the hole plug 10 includes a case 18, a panel 20, and a filter 21. The panel 20 and the filter 21 are detachably attached inside the case 18. A configuration may be adopted in which the panel 20 and the filter 21 are integrated to the case 18. A configuration without the filter 21 may also be adopted.

As illustrated in FIG. 1, in the hole plug 10, an upper portion 22 of the case 18 is insertable into the opening hole 14.

Figure 4:
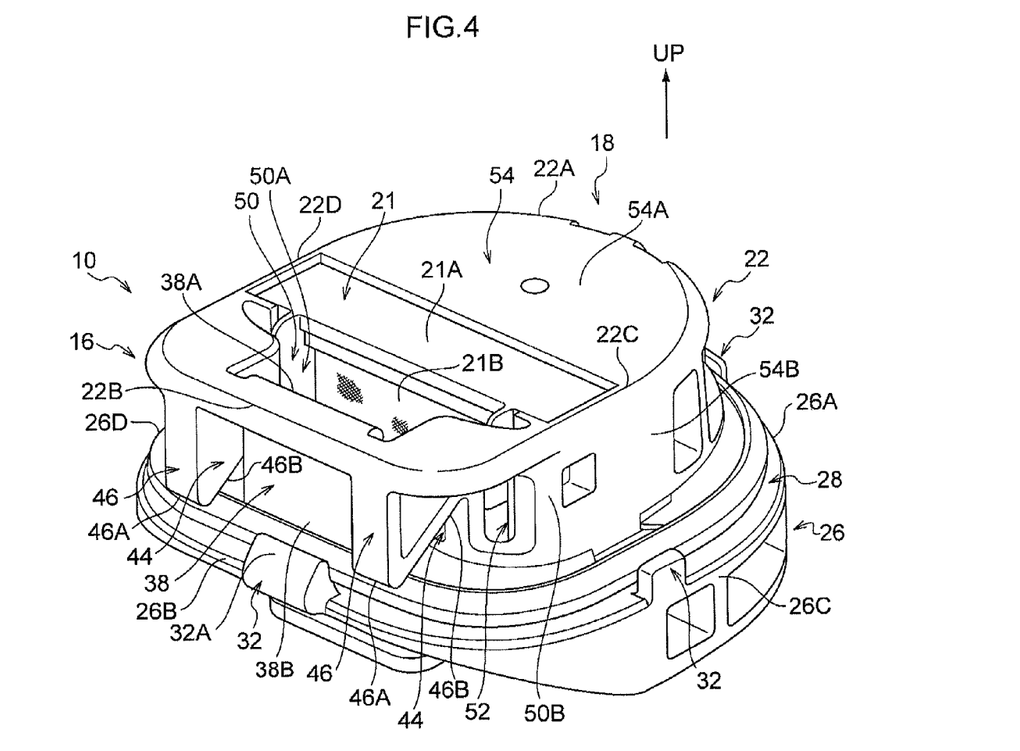
FIG. 4 is a perspective view illustrating a hole plug according to the first exemplary embodiment of the present invention, as viewed from above at an angle of a resilient engagement portion side.

As illustrated in FIG. 4, the upper portion 22 of the case 18 as viewed from above has a shape corresponding to the opening hole 14, in which one side 22A out of four sides has a circular arc shape, and the other three sides 22B, 22C, 22D configure a straight line. A flange section 26 is formed projecting out at an outer peripheral portion of a lower portion of the case 18. The outer periphery of the flange section 26, as viewed along the up-down direction, is shaped with one side 26A out of four sides having a circular arc shape, and the other three sides 26B, 26C, 26D having straight line shapes, so as to be shaped to follow the peripheral edge portion of the opening hole 14.

A groove 28 is continuously formed in the outer peripheral portion of the case 18, at the upper side of the flange section 26, and adjacent to the flange section 26. Packing 30 illustrated in FIG. 3 is attachable to the groove 28. Protrusions 32 project upward at specific intervals along the peripheral direction of the outer peripheral portion of the flange section 26, so as to retain the packing 30 in the attached position.

As illustrated in FIG. 1, the packing 30 makes close contact with the lower face side of the peripheral edge portion of the opening hole 14 in the floor panel 12, so as to seal between the flange section 26 and the lower face of the floor panel 12. An engagement section 34 is configured between the upper portion 22 of the case 18 and the groove 28 to engage with the peripheral edge portion of the opening hole 14, and the engagement section 34 includes a groove portion 36 (engagement portion) and a resilient engagement portion 38 (engagement portion).

Figure 2:
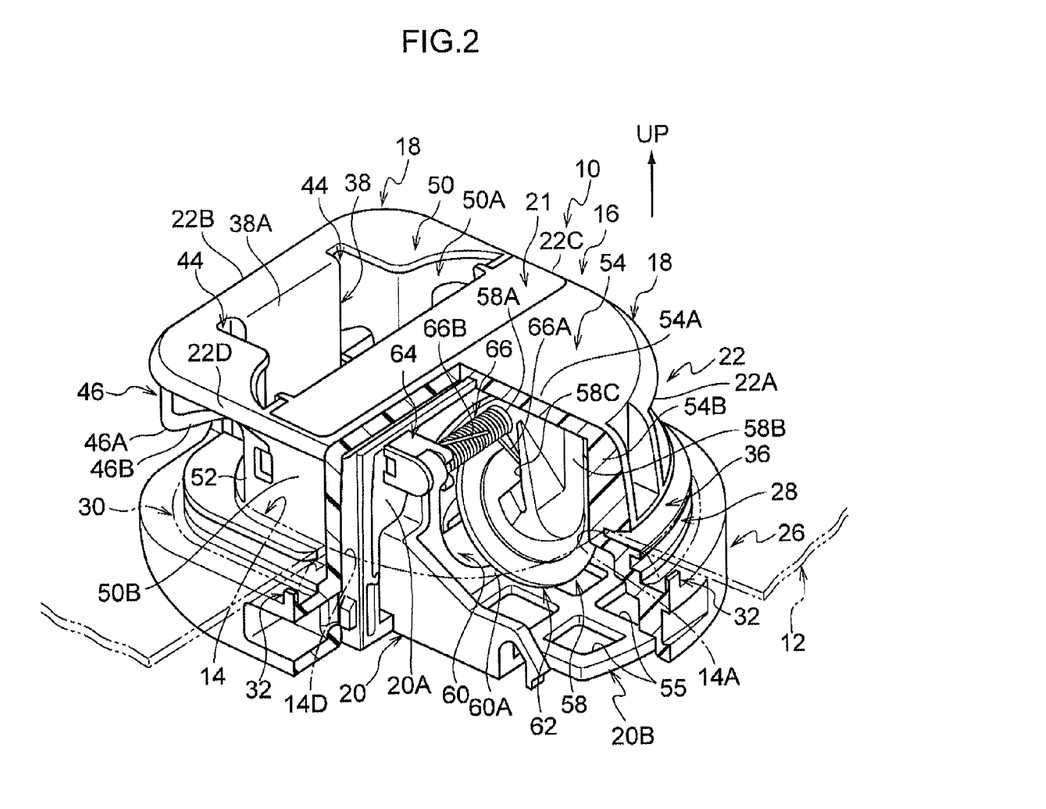
FIG. 2 is a perspective view illustrating a hole plug according to the first exemplary embodiment of the present invention with a partial cross-section, as viewed from above at an angle of a groove portion side.

As illustrated in FIG. 2, the groove portion 36 is formed below the side 22A of the upper portion 22. The groove portion 36 has a circular arc shaped profile as viewed along the up-down direction, and the side 14A of the opening hole 14 is inserted into the groove portion 36 so as to engage.

As illustrated in FIG. 4, the resilient engagement portion 38 is formed below the side 22B of the upper portion 22 of the case 18. The shape of the resilient engagement portion 38 as viewed along the up-down direction is a straight line shape, so that the side 14B of the opening hole 14 (see FIG. 3) engages therewith.

The resilient engagement portion 38 configures a portion of an outer peripheral wall portion of the upper portion 22 of the case 18, and is resiliently deformable toward the inside direction of the opening hole 14 (the arrow A direction in FIG. 1) about an upper end edge portion 38A. A pair of protrusions 46 project downward at the two outside ends in the length direction (width direction) of the resilient engagement portion 38 in the case 18 such that a gap 44 is formed between the pair of protrusions 46.

As illustrated in FIG. 1, lower ends 46A of the protrusions 46 are disposed further to the outside than the resilient engagement portion 38, so as to make contact with locations on the upper face side of the opening hole 14 in the floor panel 12. An inside wall portion 46B of each of the protrusions 46 slopes from the lower outside toward the upper inside, and the upper end of the inside wall portion 46B is connected to an upright wall 48 that is formed with a circular arc shape that is convex toward the inside. A lower end edge 38B of the resilient engagement portion 38 is configured to be resiliently pressed against the side 14B of the opening hole 14.

The resilient engagement portion 38 is thereby capable of elastic deformation about the upper end edge portion 38A toward the inner peripheral direction of the opening hole 14 (the arrow A direction in FIG. 1), or toward the outside direction (the arrow B direction in FIG. 1) when the hole plug 10 is attached to or removed from the opening hole 14. An outer peripheral face 32A of a protrusion 32 formed between the pair of protrusions 46 curves from the lower outside toward the upper inside, so as to guide the side 14B of the opening hole 14 toward the lower end edge 38B of the resilient engagement portion 38 during attaching of the hole plug 10 to the opening hole 14.

As illustrated in FIG. 4, a water entry section 50 is formed at a location on the case 18 where the resilient engagement portion 38 is formed. A water entry port 50A is formed at the top of the water entry section 50. Water entry ports 52 are also formed at an outer peripheral wall portion 50B of the water entry section 50. Water that has accumulated on the floor panel 12 accordingly enters inside the water entry section 50 of the case 18 through the water entry port 50A, the gap 44, and the water entry ports 52.

A valve housing section 54 is formed at a location of the case 18 on the side where the groove portion 36 is formed. An upper portion of the valve housing section 54 is closed off by an upper wall portion 54A, and an outer wall portion 54B of the valve housing section 54 is connected to an outer peripheral wall portion 50B of the water entry section 50.

As illustrated in FIG. 3, the panel 20 is capable of being inserted into, and engaged with, the inside of the valve housing section 54 of the case 18 through an opening 56 formed below the valve housing section 54. The panel 20 includes an upright wall section 20A formed along the up-down direction, and a lattice shaped section 20B that extends in a horizontal direction from the lower end of the upright wall section 20A. The upright wall section 20A of the panel 20 is configured to partition between the valve housing section 54 and the water entry section 50, and a flap valve 58 (valve body) is provided at the upright wall section 20A. A water discharge port 60 is formed in a circular shape at a central portion of the upright wall section 20A, such that water flows from the water entry section 50 into the valve housing section 54 through the water discharge port 60. A shaft section 58A is formed at an upper end portion of the flap valve 58, and the shaft section 58A and a valve portion 62 of the flap valve 58 are connected together by a connection portion 58B. The valve portion 62 is shaped in a circle, and is configured such that a peripheral edge portion 62A makes contact with an opening edge portion 60A of the water discharge port 60.

As illustrated in FIG. 1, the upper portion of the water discharge port 60 is positioned above the opening hole 14 in a state in which the hole plug 10 is attached to the opening hole 14.

Figure 5:
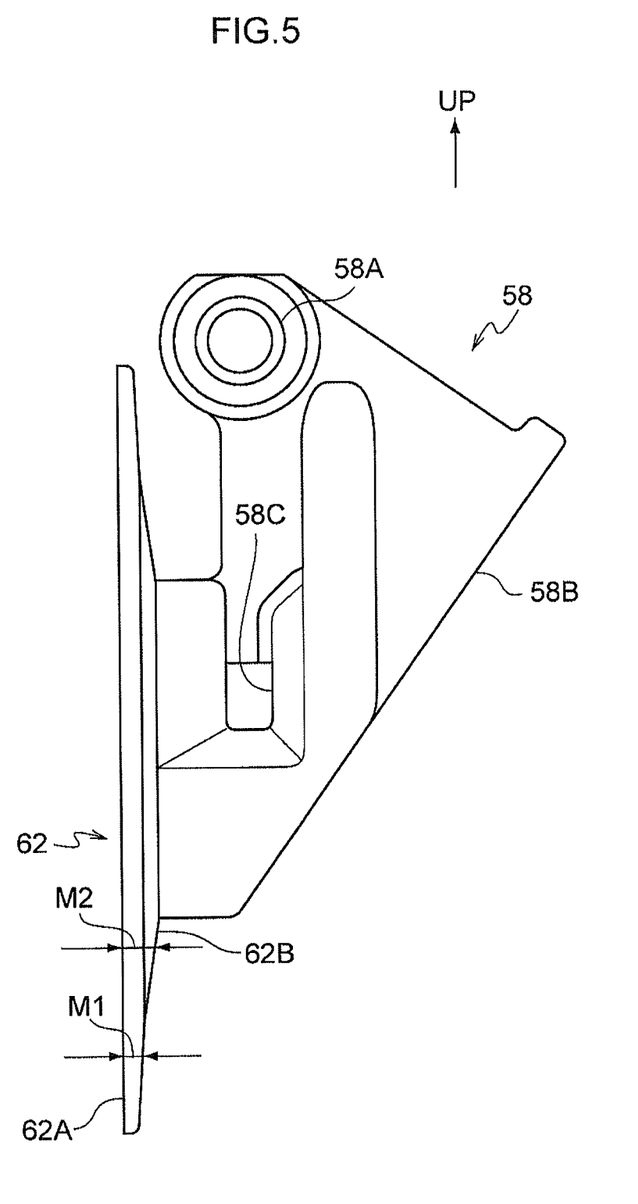
FIG. 5 is side view illustrating a plug valve of a hole plug according to the first exemplary embodiment of the present invention.

As illustrated in FIG. 5, the valve portion 62 has a thickness M1 of the peripheral edge portion 62A that is thinner than a thickness M2 of a central portion 62B thereof. This thereby enables rigidity to be secured in the valve portion 62 of the flap valve 58, while at the same time the peripheral edge portion 62A of the valve portion 62 of the flap valve 58 flexes, so as to make close contact with the opening edge portion 60A of the water discharge port 60. The thickness M2 of the central portion 62B gradually gets thicker on progression toward the inner circumferential side.

As illustrated in FIG. 3, a pair of shaft bearing portions 64 are formed at an upper portion of the upright wall section 20A of the panel 20 so as to project out toward the inside direction of the valve housing section 54.

As illustrated in FIG. 1, the shaft bearing portions 64 are positioned higher in the hole plug 10 than the groove portion 36 of the engagement section 34 and the lower end edge 38B of the resilient engagement portion 38 that are contact portions with the opening hole 14,. The two end portions of the shaft section 58A of the flap valve 58 are respectively axially supported by the shaft bearing portions 64 so as to be rotatable. The hole plug 10 according to the present exemplary embodiment is accordingly configured so as to be capable of shortening the overall length l11 along the up-down direction more than configurations in which the shaft bearing portions 64 are positioned below the opening hole 14.

A coil spring 66 is disposed on the shaft section 58A of the flap valve 58 as a biasing member. The coil spring 66 is disposed at an outer circumferential portion of the shaft section 58A, and one end 66A of the coil spring 66 is anchored to an anchor portion 58C formed at the connection portion 58B of the flap valve 58. The other end 66B of the coil spring 66 is anchored to an anchor portion 68 formed at the bottom face of the upper wall portion 54A of the valve housing section 54.

In a state in which the hole plug 10 is attached to the opening hole 14 of the floor panel 12, an opening face S1 of the water discharge port 60 faces upward at an angle, and is inclined from the vertical direction by an opening angle θ1 toward the horizontal direction. The water discharge port 60 is configured so as to be opened and closed by the flap valve 58, with the opening edge portion 60A of the water discharge port 60 supporting the valve portion 62 of the flap valve 58, at an angle from the lower side.

A configuration is thereby achieved in which the valve portion 62 of the flap valve 58 closes off the water discharge port 60 at an angle from above in a direction intersecting with the vertical direction (the vehicle up-down direction) when the hole plug 10 is in an attached state to the opening hole 14 of the floor panel 12. Weight of the flap valve 58 is accordingly added to the biasing force of the coil spring 66. Weight of the flap valve 58, due to gravity acting on the flap valve 58, is force acting when the flap valve 58 is swung downward about the shaft section 58A.

A bottom portion 50C of the water entry section 50 in the case 18 has a curved face sloping toward the lower side on progression toward a lower end portion 60B of the water discharge port 60 when the hole plug 10 is in an attached state to the opening hole 14 of the floor panel 12. A configuration is thereby achieved in which water that has entered into the water entry section 50 of the case 18 can flow rapidly and completely out through the water discharge port 60 to the valve housing section 54.

The filter 21 inside the water entry section 50 of the case 18 is inserted through the water entry port 50A formed at the top of the water entry section 50, and attached. The filter 21 includes a rectangular shaped mesh 21A, and a rectangular shaped frame 21B that supports the outer peripheral portion of the mesh 21A engages with the case 18. At the upstream side of the water discharge port 60, the filter 21 partitions a flow path between the water entry section 50 and the valve housing section 54, such that water that has passed though the filter 21 flows through the water discharge port 60, whereby the water flows from the water entry section 50 to inside of the valve housing section 54.

As illustrated in FIG. 2, the lower portion of the valve housing section 54 is covered by a lattice shaped section 20B of the panel 20, and plural rectangular shaped opening portions 55 are formed in the lattice shaped section 20B of the panel 20. A configuration is accordingly achieved in which water that has entered into the valve housing section 54 through the water discharge port 60, is discharged to outside of the hole plug 10 (outside of the vehicle) through the opening portions 55. Moreover, when installed to a vehicle, flying stones or the like arising during travel of the vehicle can also be prevented by the lattice shaped section 20B from striking the flap valve 58 and the coil spring 66.

Operation and Advantageous Effects

Explanation next follows regarding operation and advantageous effects of the hole plug according to the present exemplary embodiment.

As illustrated in FIG. 1, in the hole plug 10 of the present exemplary embodiment, the flap valve 58 is biased, by the biasing force of the coil spring 66 and weight of the flap valve 58, in the direction to close off the water discharge port 60, and the water discharge port 60 is closed off. Ingress of exhaust gas, water, and the like outside of the vehicle can accordingly be prevented.

When water enters onto the floor panel 12, the water enters into the water entry section 50 through the water entry port 50A, the gap 44, and the water entry ports 52 in the case 18 of the housing 16, and accumulates in the water entry section 50. When this occurs, up to the point when the water accumulated in the water entry section 50 reaches a specific amount, the water pressure in the water entry section 50 is less than the biasing force of the coil spring 66 and weight of the flap valve 58, and so the flap valve 58 closes off the water discharge port 60.

Figure 6:
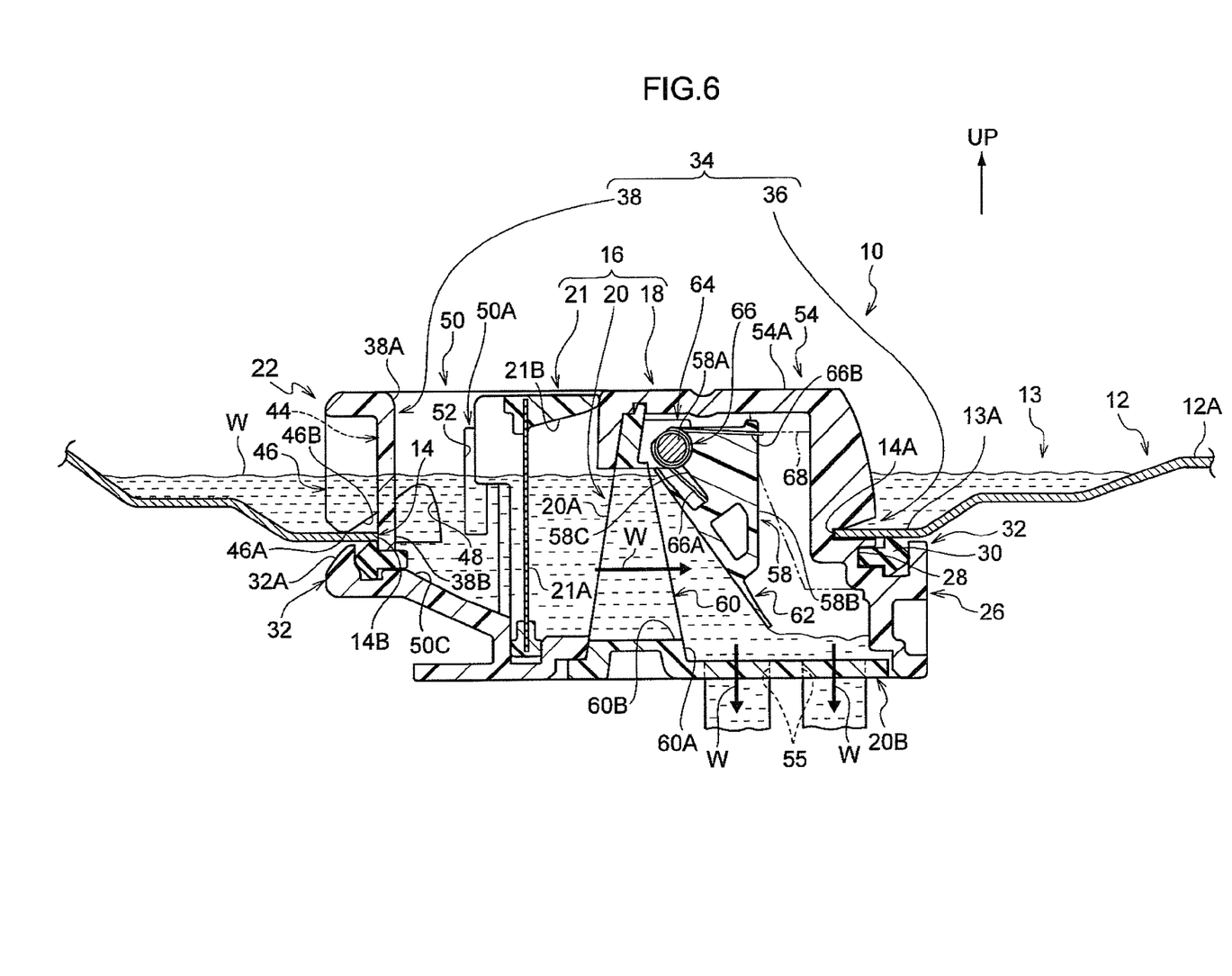
FIG. 6 is a side cross-section illustrating an open state of a hole plug according to the first exemplary embodiment of the present invention.

As illustrated in FIG. 6, when the water W accumulated in the water entry section 50 has exceeded the specific amount, and the water pressure inside the water entry section 50 has become greater than the biasing force of the coil spring 66 and weight of the flap valve 58, the flap valve 58 swings in the open position direction due to the shaft section 58A of the flap valve 58 rotating with respect to the shaft bearing portions 64 formed at the upright wall section 20A of the panel 20. The water W inside the water entry section 50 is accordingly discharged to outside the hole plug 10 (outside of the vehicle) through the water discharge port 60, and through the opening portions 55 of the lattice shaped section 20B of the panel 20.

As a result, water penetration into a battery pack can be prevented in a hybrid vehicle in which a battery pack is disposed on the floor panel 12. In the present exemplary embodiment, the opening hole 14 is formed at a bottom portion 13A of an indentation 13 formed in the general surface 12A of the floor panel 12 (the surface to which the battery pack is attached), and configuration is made such that the flap valve 58 swings toward the open position prior to the water level of the water W reaching the upper end of the indentation 13.

In the hole plug 10 of the present exemplary embodiment, as illustrated in FIG. 1, the shaft bearing portions 64 that axially support the shaft section 58A of the flap valve 58 are positioned above the groove portion 36 of the engagement section 34 and above the lower end edge 38B of the resilient engagement portion 38, both act as the contact portion with the opening hole 14,. This thereby enables the length H1 of the hole plug 10 along the up-down direction to be made shorter than in configurations in which the shaft bearing portions 64 is positioned below the opening hole 14, thereby enabling attachment within a confined space. The projection length H2 by which the hole plug 10 projects out from the opening hole 14 of the floor panel 12 toward the vehicle lower side can also be made shorter.

Figure 7:
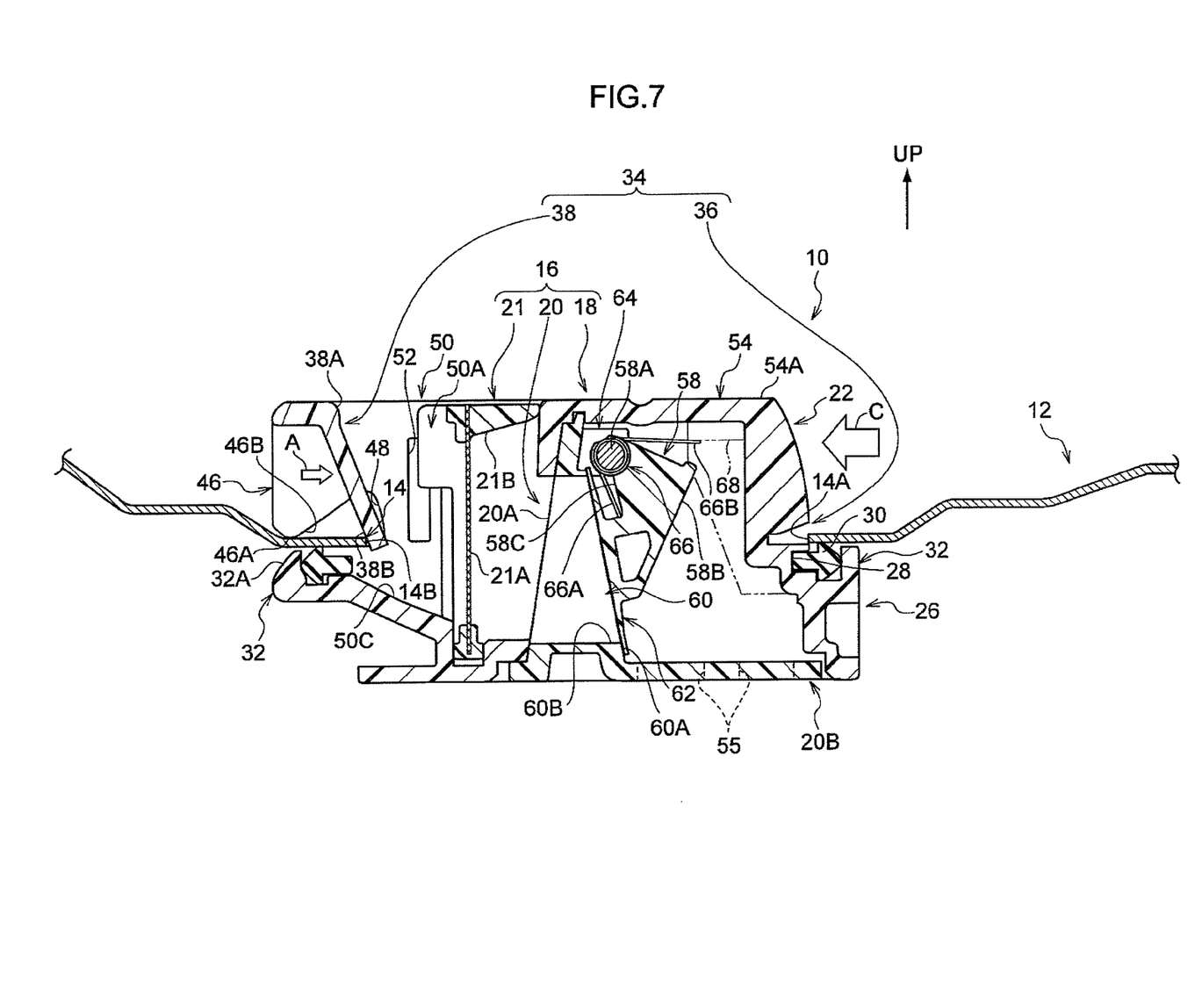
FIG. 7 is a side cross-section illustrating an operation to remove a hole plug according to the first exemplary embodiment of the present invention.
Figure 8:
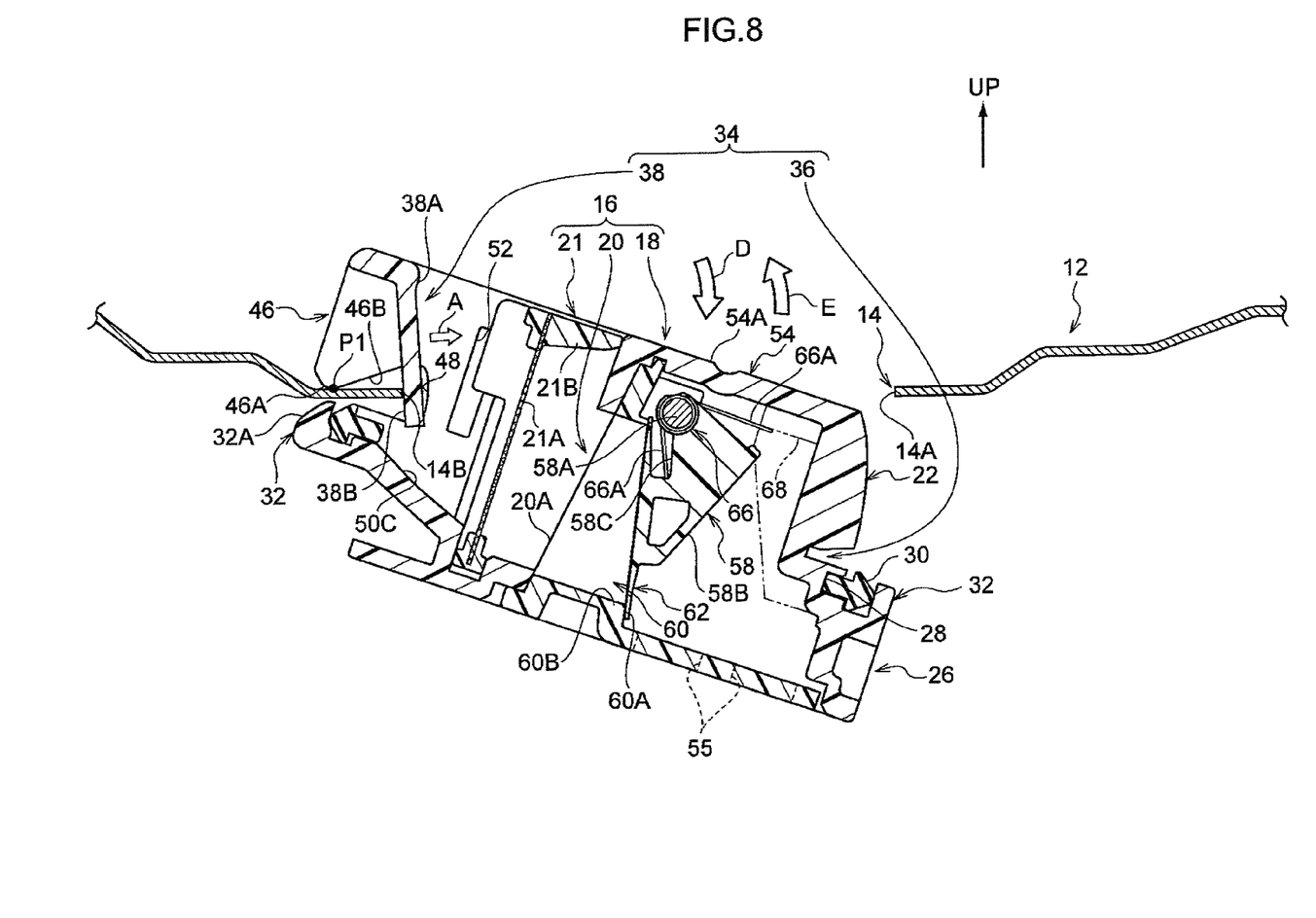
FIG. 8 is a side cross-section illustrating an operation to remove, and an operation to attach, a hole plug according to the first exemplary embodiment of the present invention.

Moreover, when detaching the hole plug 10 from the opening hole 14 of the floor panel 12, as illustrated in FIG. 7, the upper portion 22 or the lower portion of the case 18 of the housing 16 is pressed from the valve housing section 54 side toward the water entry section 50 side (the arrow C direction in FIG. 7). The resilient engagement portion 38 is thereby resiliently deformed about the upper end edge portion 38A toward the inner peripheral direction of the opening hole 14 (the arrow A direction in FIG. 7), and the hole plug 10 is slid in the arrow B direction. This thereby enables engagement between the groove portion 36 of the case 18 and the side 14A of the opening hole 14 to be released. Then, as illustrated in FIG. 8, the hole plug 10 is rotated downward (the arrow D direction in FIG. 8) about a rotation center P1 of the contact portion in the vicinity of the lower ends 46A of the protrusions 46, and the side 14B of the opening hole 14 in the floor panel 12, and the upper portion of the case 18 is pulled out downward from the opening hole 14. As a result, the hole plug 10 can be easily detached from the opening hole 14 of the floor panel 12.

Moreover, in order to attach the hole plug 10 of the present exemplary embodiment to the opening hole 14 of the floor panel 12, as illustrated in FIG. 8, the location on the resilient engagement portion 38 side of the upper portion 22 of the case 18 in the housing 16 is inserted in an diagonal direction from the lower side of the floor panel 12. The resilient engagement portion 38 of the case 18 is then pressed against the side 14B of the opening hole 14 in an diagonal direction from below, and the resilient engagement portion 38 is resiliently deformed about the upper end edge portion 38A toward the inner peripheral direction of the opening hole 14 (the arrow A direction in FIG. 8). The hole plug 10 is then rotated upward (in the arrow E direction in FIG. 8) about a rotation center P1 of the contact portion in the vicinity of the lower ends 46A of the protrusions 46, and the side 14B of the opening hole 14 in the floor panel 12. The hole plug 10 is then slid toward the side 14A side of the opening hole 14, and the groove portion 36 is engaged with the side 14A of the opening hole 14. When the side 14A of the opening hole 14 engages with the groove portion 36, the resilient engagement portion 38 rebounds toward the outside direction (the arrow B direction of FIG. 1), and the lower edge portion 38B makes contact with the packing 30. As a result, the hole plug 10 can be easily attached to the opening hole 14 of the floor panel 12.

Moreover, in the hole plug 10 according to the present exemplary embodiment, the lattice shaped section 20B of the panel 20 configuring the lower portion of the housing 16 covers the lower side of the flap valve 58 and the coil spring 66. Water that has entered inside the valve housing section 54 through the water discharge port 60 can accordingly be discharged to outside the hole plug 10 (outside of the vehicle) through the opening portions 55. Moreover, flying stones or the like arising during travel of the vehicle can also be prevented by the lattice shaped section 20B from striking and damaging the flap valve 58 and the coil spring 66.

In the hole plug 10 of the present exemplary embodiment, the thickness M1 of the peripheral edge portion 62A of the valve portion 62 of the flap valve 58 that makes contact with the opening edge portion 60A of the water discharge port 60 is thinner than the thickness M2 of the central portion 62B. The rigidity of the valve portion 62 of the flap valve 58 can thereby be secured, and the peripheral edge portion 62A of the valve portion 62 of the flap valve 58 flexes to make close contact with the opening edge portion 60A of the water discharge port 60. As a result, the sealing property of the flap valve 58 can accordingly be raised.

Moreover, in the hole plug 10 of the present exemplary embodiment, the water discharge port 60 is formed at the upright wall section 20A of the panel 20. A configuration is thereby achieved in which, when the hole plug 10 is in an attached state to the opening hole 14 of the floor panel 12, the valve portion 62 of the flap valve 58 closes off the water discharge port 60 in a direction intersecting with the vertical direction in which water is accumulates in the water entry section 50. As a result, weight of the flap valve 58 is added to the biasing force of the coil spring 66, enabling the load of the coil spring 66 to be lightened. Moreover, even if, by chance, the biasing force of the coil spring 66 ceases to act on the flap valve 58 due to the coil spring 66 breaking or the like, the water discharge port can still be closed off by the weight of the flap valve 58. The upper portion of the water discharge port 60 is also positioned above the opening hole 14. The upper portion of the water discharge port 60 is accordingly above the water level when there is a small amount of water. As a result, the water pressure acting on the flap valve 58 is lowered, enabling the load of the coil spring 66 to be further reduced.

Moreover, in the hole plug 10 according to the present exemplary embodiment, in an attached state to the opening hole 14 of the floor panel 12, the opening face S1 of the water discharge port 60 faces upward at an angle and supports the valve portion 62 of the flap valve 58 at an angle from the lower side. Weight of the flap valve 58 is accordingly added to the biasing force of the coil spring 66, enabling the load of the coil spring 66 to be further reduced.

In the hole plug 10 according to the present exemplary embodiment, in a state attached to the opening hole 14 of the floor panel 12, the bottom portion 50C of the water entry section 50 has a curved face sloping toward the lower side on progression toward the lower end portion 60B of the water discharge port 60. Thus when the flap valve 58 is open, the water that has accumulated in the water entry section 50 can be rapidly and completely discharged.

Other Exemplary Embodiments

Figure 9:
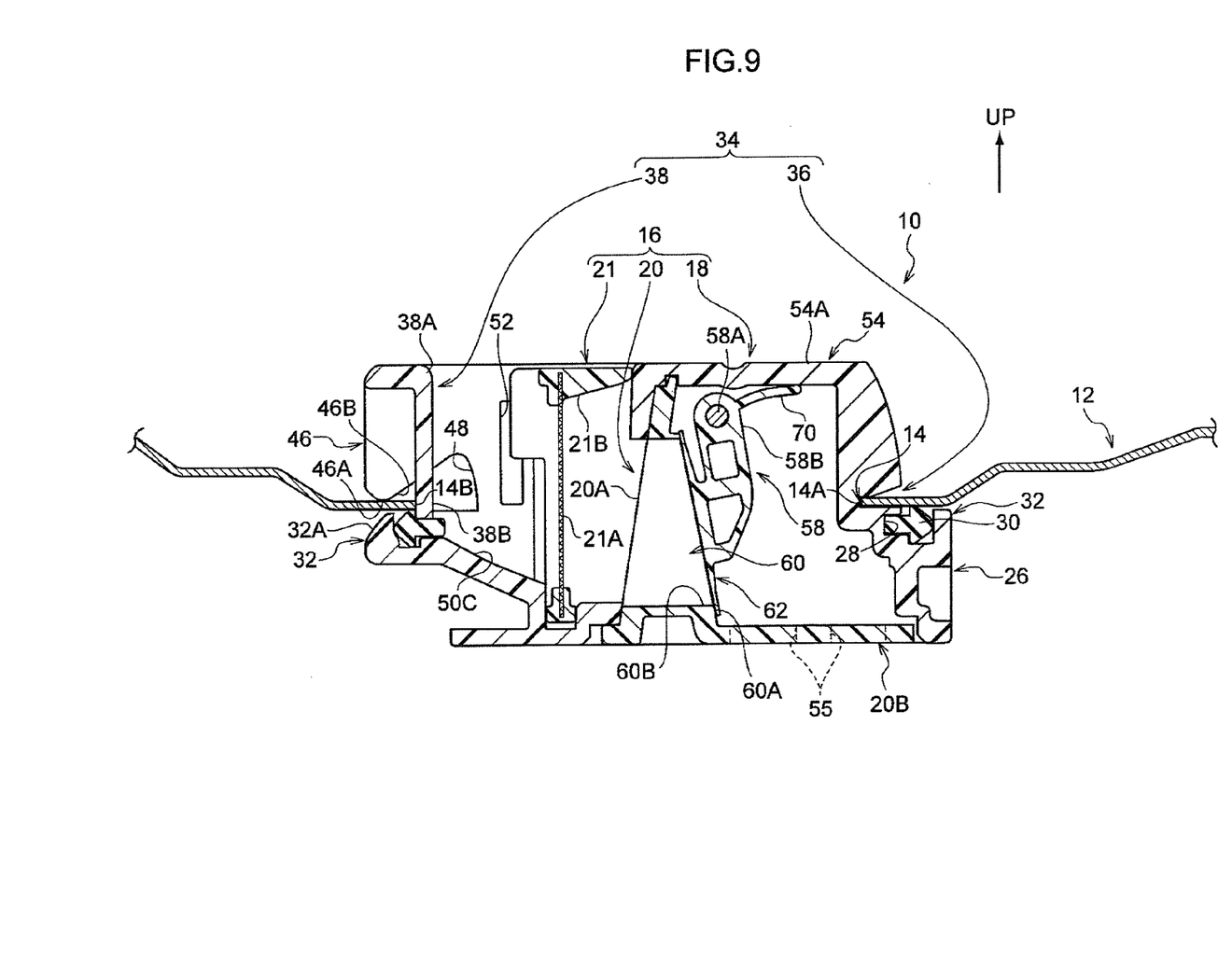
FIG. 9 is a side cross-section illustrating a closed state of a hole plug according to a second exemplary embodiment of the present invention.

Detailed explanation has been given above regarding particular exemplary embodiments of the present invention, but the present invention is not limited to the exemplary embodiments, and it will be obvious to a person skilled in the art that various other exemplary embodiments are possible within the scope of the present invention. For example, instead of the coil spring 66, configuration may be made such that, as in a second exemplary embodiment illustrated in FIG. 9, a protrusion 70 (biasing member) is integrally formed from a connection portion 58B of the flap valve 58, with a plate shape capable of resilient deformation. The protrusion 70 serves as a biasing member. In such a configuration, the protrusion 70 presses against the lower face of the upper wall portion 54A of the valve housing section 54, such that the flap valve 58 closes off the water discharge port 60.

Moreover, although in the first exemplary embodiment, the coil spring 66 is employed as the biasing member, another biasing member, such as a leaf spring, may be employed in place of the coil spring 66.

In each of the above exemplary embodiments, the engagement section 34 is configured with the groove portion 36 and the resilient engagement portion 38; however, another configuration may be adopted, such as a resiliently deformable engagement claw as the engagement section 34, instead of the groove portion 36 and the resilient engagement portion 38.

In each of the above exemplary embodiments, the thickness Ml of the peripheral edge portion 62A of the valve portion 62 of the flap valve 58 that makes contact with the opening edge portion 60A of the water discharge port 60 is thinner than the thickness M2 of the central portion 62B. However, instead of this configuration, the thickness of the peripheral edge portion 62A and the thickness of the central portion 62B may be made the same. The shape of the water discharge port 60 and the shape of the valve portion 62 may also be a shape other than circular, such as an oval shape.

In each of the above exemplary embodiments, the opening face of the water discharge port 60 faces upward at an angle in an attached state of the hole plug 10 to the opening hole 14 of the floor panel 12; however, instead of this, configuration may be made in which the opening face of the water discharge port 60 faces in the vertical direction, or in the horizontal direction.

Moreover, in each of the exemplary embodiments, the bottom portion 50C of the water entry section 50 has a curved face sloping toward the lower side and toward the lower end portion 60B of the water discharge port 60; however, instead, the bottom portion 50C of the water entry section 50 may be a flat sloped face or a horizontal face.

Moreover, in each of the above exemplary embodiments, there are plural rectangular shaped opening portions 55 formed at the lower wall portion of the panel 20 as the lattice shaped section 20B; however, the shape of the opening portions 55 may be another shape, such as a circular shape. Configuration may also be made with the lattice shaped section 20B (lower wall portion) of the panel 20 omitted.

Moreover, in each of the above exemplary embodiments, the hole plug of the present invention is applied to a floor panel 12 of a vehicle as an attached-to member; however, the hole plug of the present invention is applicable to other locations in a vehicle other than the floor panel 12, such as to an engine under-cover. It is moreover applicable to applications other than vehicular applications.

The invention claimed is:

1. A hole plug comprising:
    a housing capable of internally accumulating water that has entered through a water entry port;
    an engagement section that is provided at the housing, that is inserted through an opening hole formed in a floor panel of an attached-to member, that engages with a peripheral edge portion of the opening hole;
    a water discharge port that is formed in the housing to discharge water that has accumulated inside the housing;
    a shaft bearing portion formed at a location on the housing positioned above an uppermost peripheral edge portion of the opening hole;
    a valve body that includes a shaft portion axially supported by the shaft bearing portion so as to be capable of rotating, and that is capable of swinging between an open position opening the water discharge port and a closed position closing off the water discharge port; and
    a biasing member that is provided at the shaft portion in order to swing the valve body in the closed position direction using biasing force, and to swing the valve body in the open position direction when water pressure inside the housing is greater than the biasing force.

2. The hole plug of claim 1, wherein the engagement section comprises:
    a resilient engagement portion that makes contact with one end of the peripheral edge portion of the opening hole and that is capable of elastic deformation toward an inner peripheral direction of the opening hole; and
    a groove portion that engages with another end of the peripheral edge portion of the opening hole.

3. The hole plug of claim 1, further comprising a lattice shaped section formed at a lower portion of the housing so as to cover a lower side of the valve body.

4. The hole plug of claim 1, wherein a thickness of a peripheral edge portion of the valve body, that makes contact with an opening edge portion of the water discharge port, is thinner than a thickness of a central portion that is formed at inner side of the peripheral edge portion of the valve body.

5. The hole plug of claim 1, wherein the water discharge port is formed in an upright wall portion of the housing, and an upper portion of the water discharge port is positioned above the opening hole.

6. The hole plug of claim 1, wherein an opening face of the water discharge port faces upward at an angle in an attached state, and supports the valve body at an angle from the lower side.

* * * * *